(12) United States Patent
Hida (10) Patent No.: US 7,540,670 B2
(45) Date of Patent: Jun. 2, 2009

(54) CAMERA APPARATUS (75) Inventor: Hiroaki Hida, Kanagawa (JP)

(73) Assignee: Sony Corporation, Tokyo (JP)

( * ) Notice: Subject to any disclaimer, the term of this patent is extended or adjusted under 35 U.S.C. 154(b) by 365 days.

(21) Appl. No.: 11/422,482

(22) Filed: Jun. 6, 2006

(65) Prior Publication Data

US 2007/0024743 A1 Feb. 1, 2007

(30) Foreign Application Priority Data

Jul. 27, 2005 (JP) ............................. 2005-216895

(51) Int. Cl.
*G03B 17/00* (2006.01)
(52) U.S. Cl. ...................... 396/427; 348/373; 361/687; 361/695; 361/719; 165/80.3
(58) Field of Classification Search ................ 396/427, 396/421, 428; 348/373; 248/183.2; 361/687, 361/719; 165/80, 86
See application file for complete search history.

(56) References Cited

U.S. PATENT DOCUMENTS

| | | | | |
|---|---|---|---|---|
| 4,144,932 A * | 3/1979 | Voigt | ........................ | 165/80.3 |
| 5,332,031 A * | 7/1994 | Kiga | ........................... | 165/86 |
| 5,689,304 A * | 11/1997 | Jones et al. | .................. | 348/373 |
| 5,765,043 A * | 6/1998 | Tyler | ............................ | 396/12 |
| 6,268,882 B1 * | 7/2001 | Elberbaum | .................. | 348/151 |
| 6,351,044 B1 * | 2/2002 | Miyahara | ..................... | 310/52 |
| 6,416,024 B1 * | 7/2002 | Lindsay | ................... | 248/183.2 |
| 6,430,042 B1 * | 8/2002 | Ohashi et al. | ............... | 361/687 |
| 6,850,025 B1 * | 2/2005 | Paolantonio et al. | ........ | 318/685 |
| 2005/0206779 A1 * | 9/2005 | Aoki et al. | ................... | 348/373 |

FOREIGN PATENT DOCUMENTS

| JP | 2000-244781 | | 9/2000 |
|---|---|---|---|
| JP | 2001078066 | A * | 3/2001 |

* cited by examiner

*Primary Examiner*—W. B. Perkey
*Assistant Examiner*—Linda B Smith
(74) *Attorney, Agent, or Firm*—Oblon, Spivak, McClelland, Maier & Neustadt, P.C.

(57) ABSTRACT

A camera apparatus includes a base; an outer case assembled on the base; an inner case assembled in the outer case; a supporting member assembled in the inner case; a camera and a board assembled in the supporting member; a cooling fan for cooling the board, and so forth. The cooling fan is provided in the inner case to blow cooling air over the board. An air inlet is located on an air intake side of the cooling fan, whereas an air outlet is located in an extension of an air discharge side of the cooling fan along the board.

9 Claims, 13 Drawing Sheets

CAMERA APPARATUS

CROSS REFERENCES TO RELATED APPLICATIONS

The present invention contains subject matter related to Japanese Patent Application JP 2005-216895 filed in the Japanese Patent Office on Jul. 27, 2005, the entire contents of which are incorporated herein by reference.

BACKGROUND OF THE INVENTION

1. Field of the Invention

The present invention relates to camera apparatuses.

2. Description of the Related Art

A camera apparatus (PTZ, Pan/Tilt/Zoom camera) for remotely panning, tilting and zooming a camera has been suggested (refer to, Japanese Unexamined Patent Application Publication No. 2000-244781). Such a camera apparatus is used by being attached to a ceiling of a building or merely put on a table or the like.

Such a camera apparatus includes a base attached to the ceiling of the building, an outer case assembled on the base so as to turn (pan) around a first imaginary axis which passes through the base, an inner case assembled in the outer case so as to turn (tilt) around a second imaginary axis which extends in a plane intersecting with the first imaginary axis, a camera and a board for controlling operation of the camera respectively assembled in the inner case.

The camera includes a lens barrel in which an imaging optical system is accommodated an imaging element for imaging a subject guided by the imaging optical system is provided in the lens barrel.

The lens barrel has a focusing mechanism for performing focusing operation and a zooming mechanism for performing zooming operation. The focusing operation is performed by moving a movable lens, which is provided in a manner movable in an optical axis direction, in the optical axis direction of the imaging optical system from among a plurality of lenses of the imaging optical system.

A driver circuit for driving a drive source (motor) of the focusing mechanism and zooming mechanism, a signal processing circuit for generating a video signal to be supplied to a display or the like by driving the imaging element and processing an imaging signal output from the imaging element, and so forth are mounted on the board. These circuits are composed of various electric components.

Since these electric components generate heat upon operation, these electric components are cooled with a heat sink.

SUMMARY OF THE INVENTION

However, in recent years, even through the electric components are cooled with the heat sink, the heat generated by the electric components is likely to be transmitted to the lens barrel, since a distance between the lens barrel and the board is reduced due to downsizing of the camera apparatus.

Incidentally, as the movable lens moves in the lens barrel, a part of the lens barrel slides on a part of the movable lens. Accordingly, a lubricant such as a grease is applied to these sliding parts.

Owing to this, if the lubricant is heated with the heat generated by the electric components, the lubricant may be deteriorated, thereby being disadvantageous to secure durability of the camera.

In view of above-described problem, it is desirable to provide a camera apparatus capable of improving durability of a camera by effectively cooling electric components and being advantageous to be downsized.

According to an embodiment of the present invention, there is provided a camera apparatus including: a base; an outer case being assembled on the base so as to turn around a first imaginary axis which passes through the base and having an outer opening extended in the outer case; an inner case being assembled in the outer case so as to turn around a second imaginary line which extends in a plane intersecting with the first imaginary axis, and having an inner opening to be moved along the outer opening when the inner case turns around the second imaginary axis; a supporting member assembled in the inner case; a camera provided at the supporting member, the camera being capable of imaging a subject through the outer opening and the inner opening, and performing focusing operation and zooming operation; and a board provided at the supporting member, the board having a circuit for controlling the focusing operation and the zooming operation and a circuit for processing an image signal generated by imaging the subject, in which a cooling fan is provided in the inner case for blowing cooling air over the board, an air inlet is provided in the inner case for the cooling air, an air outlet is provided in the inner case for the cooling air which has been blown over the board, an air lead-in port is provided in the outer case for leading the cooling air to the air inlet, and an air lead-out port is provided in the outer case for leading the cooling air out of the outer case.

With such an embodiment, the heat generated by the electric components of the board can be effectively cooled with the cooling air to reduce the heat transmitted to the camera in the inner case. Therefore, the lubricant such as the grease applied to the sliding parts of the camera can be reliably prevented from being deteriorated, thus addressing the problem related to the heat generated by the electric components upon the downsizing of the camera apparatus, and being advantageous to downsize the camera apparatus.

DESCRIPTION OF THE PREFERRED EMBODIMENTS

First Embodiment

An embodiment of a camera apparatus according to the present invention will be described below with reference to the attached drawings.

Figure 1:
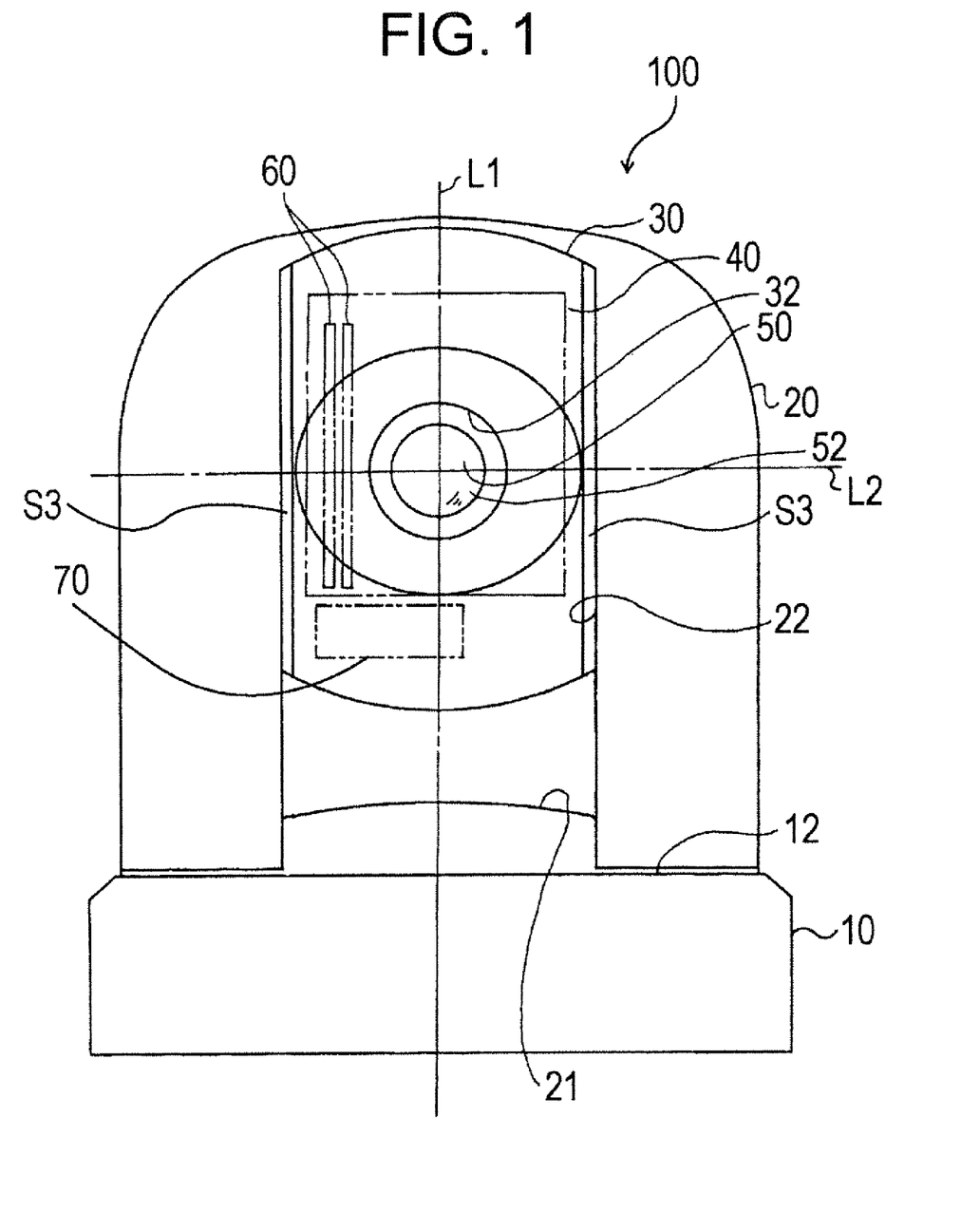
FIG. 1 is a front view of a camera apparatus 100 according to a first embodiment of the present invention.
Figure 2:
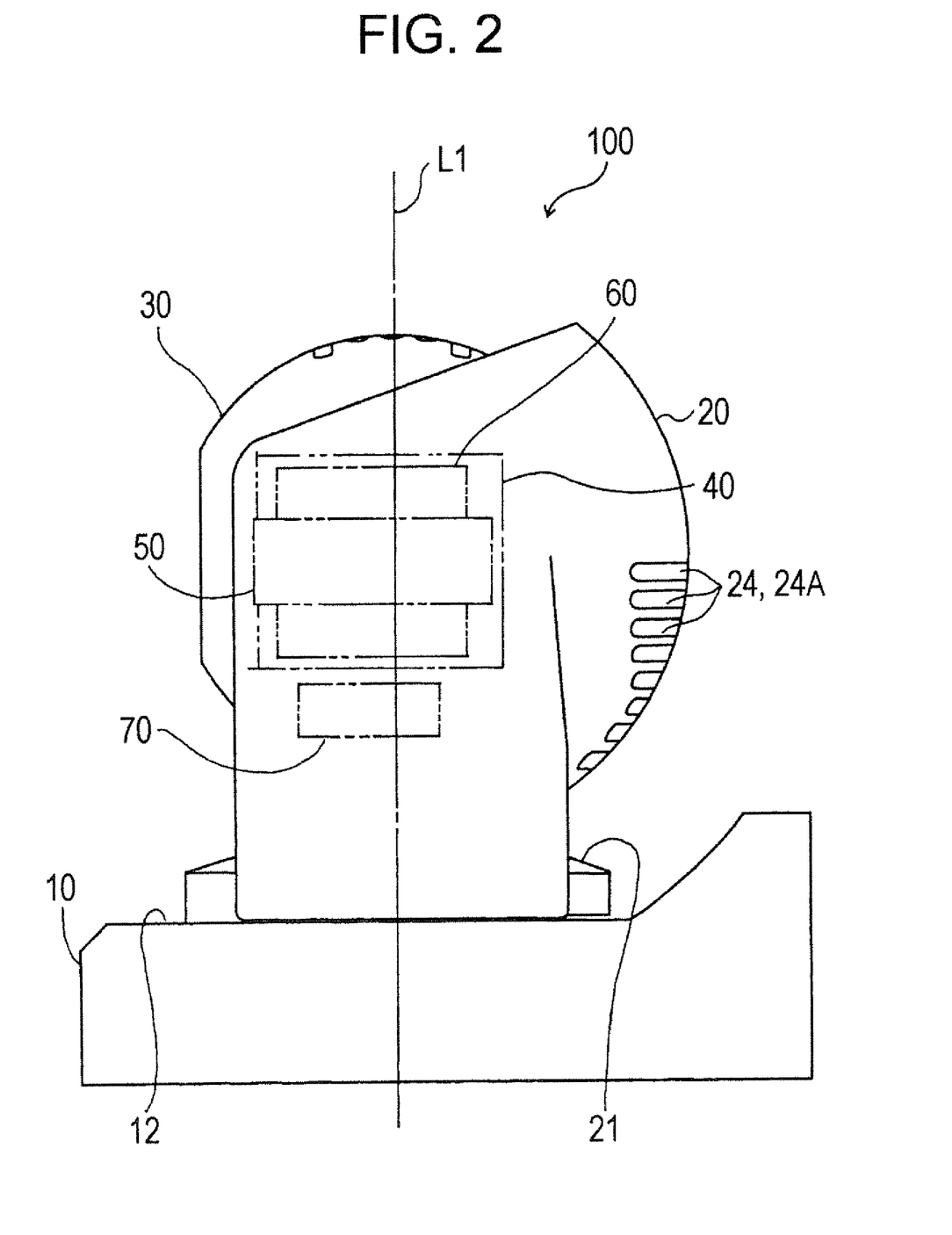
FIG. 2 is a side view of the camera apparatus 100.
Figure 3:
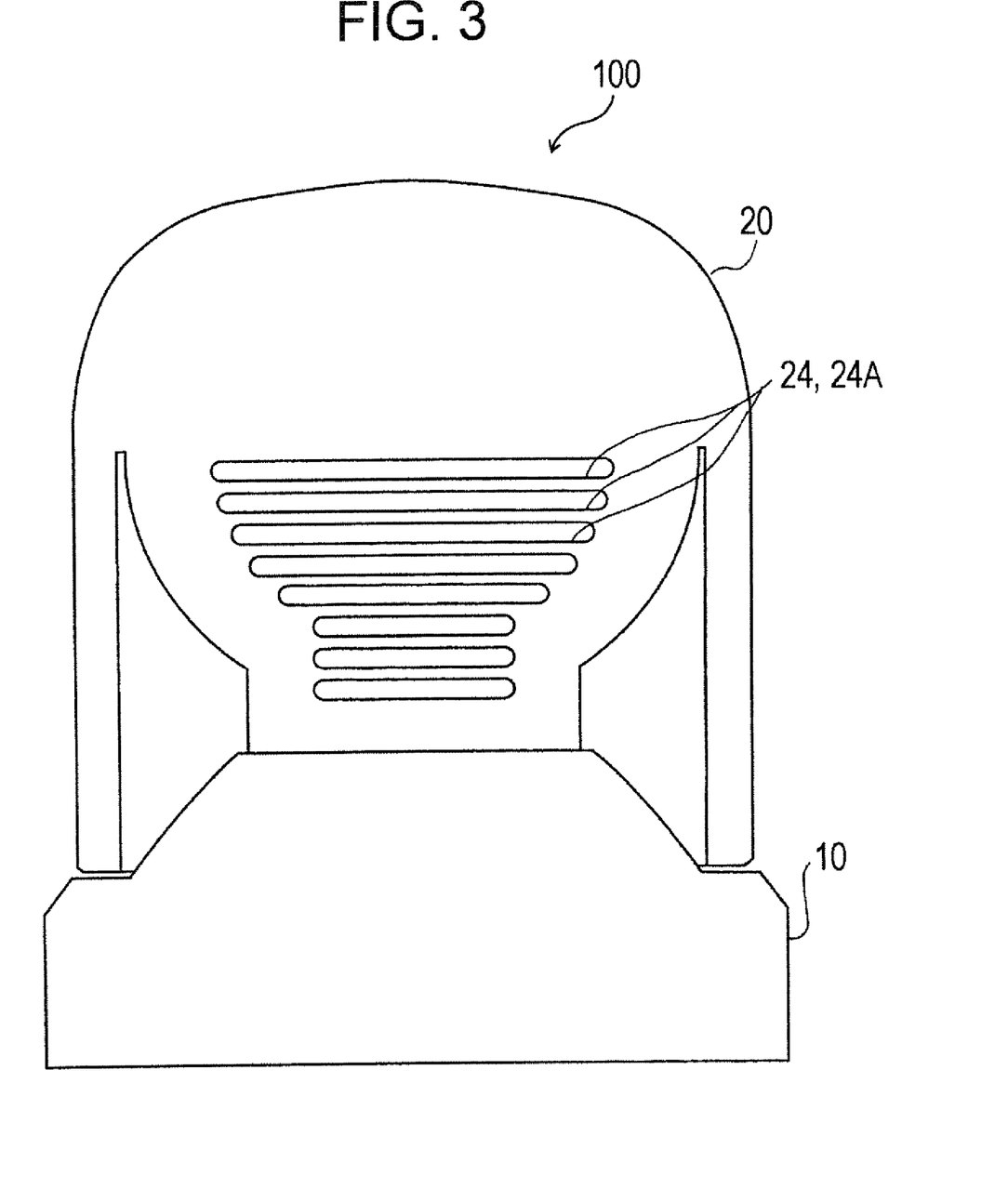
FIG. 3 is a rear view of the camera apparatus 100.
Figure 4:
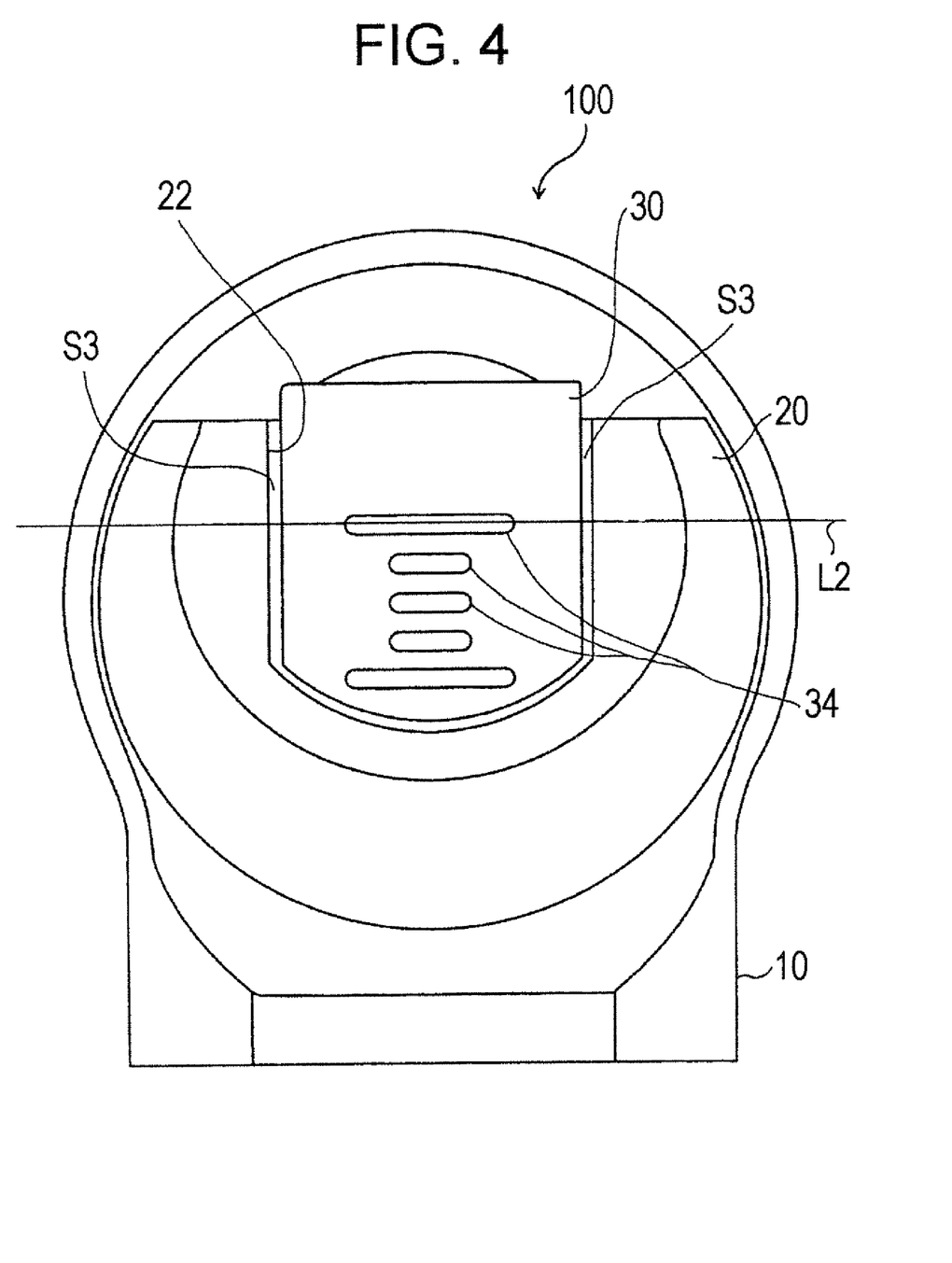
FIG. 4 is a plan view of the camera apparatus 100.

FIG. 1 is a front view of a camera apparatus 100 according to a first embodiment, FIG. 2 is a side view of the camera apparatus 100, FIG. 3 is a rear view of the camera apparatus 100, and FIG. 4 is a plan view of the camera apparatus 100.

As shown in FIGS. 1 to 4, the camera apparatus 100 includes a base 10, an outer case 20 assembled on the base 10, an inner case 30 assembled in the outer case 20, a supporting member 40 assembled in the inner case 30, a camera 50 and boards 60 assembled in the supporting member 40, a cooling fan 70 for cooling the boards 60, and the like.

The base 10 is attached to a ceiling or a wall inside a room, or to a pillar inside/outside the room, and has a mounting surface 12 to which the outer case 20 is attached.

As shown in FIGS. 1 and 2, the outer case 20 is assembled on the base 10 so as to turn around a first imaginary axis L1 which passes through the base 10. In the present embodiment, the outer case 20 is turnable through 340 degrees around the first imaginary axis L1. In particular, the outer case 20 is turnable through 170 degrees leftward and rightward with respect to a reference position where the optical axis of the camera 50 is set to the front.

The first imaginary axis L1 is perpendicular to the mounting surface 12. The outer case 20 is provided to extend in a direction perpendicular to the mounting surface 12. In the present embodiment, the first imaginary axis L1 is a vertical axis.

As shown in FIGS. 1, 2 and 4, the outer case 20 has a front part formed to be cylindrical, and a rear part formed to be spherically bulged toward the rear at the upper part thereof and provided with a disk 21 at the lower part thereof. The disk 21 turns on the mounting surface 12.

As shown in FIGS. 1 and 4, an outer opening 22 is provided in the outer case 20, the outer opening 22 extending from the front part to the top of the outer case 20 with a regular width. The outer opening 22 extends from the lower end of the outer case 20, where the disk 21 is exposed, to the top thereof along a direction parallel to the first imaginary axis L1.

As shown in FIGS. 2 and 3, a plurality of slits 24A are provided at the lower rear part of the outer case 20, the slits 24A horizontally extending and being spaced to each other in the vertical direction. The plurality of slits 24A define an air circulation port 24.

Although not shown, the outer case 20 is dividable into front and rear parts, so that the inner case 30 is assembled therein.

Figure 5:
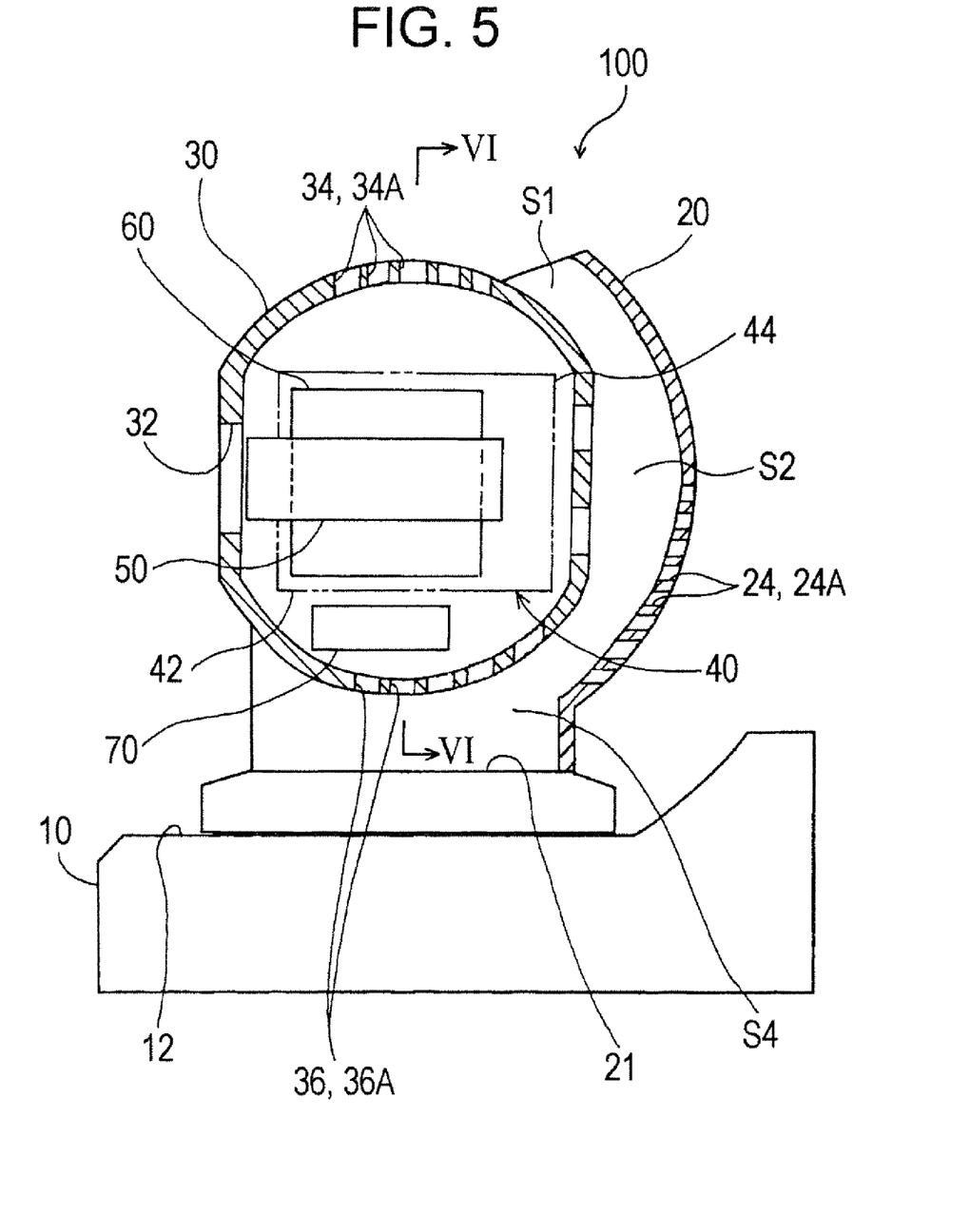
FIG. 5 is a cross section showing the inner structure of the camera apparatus 100.
Figure 6:
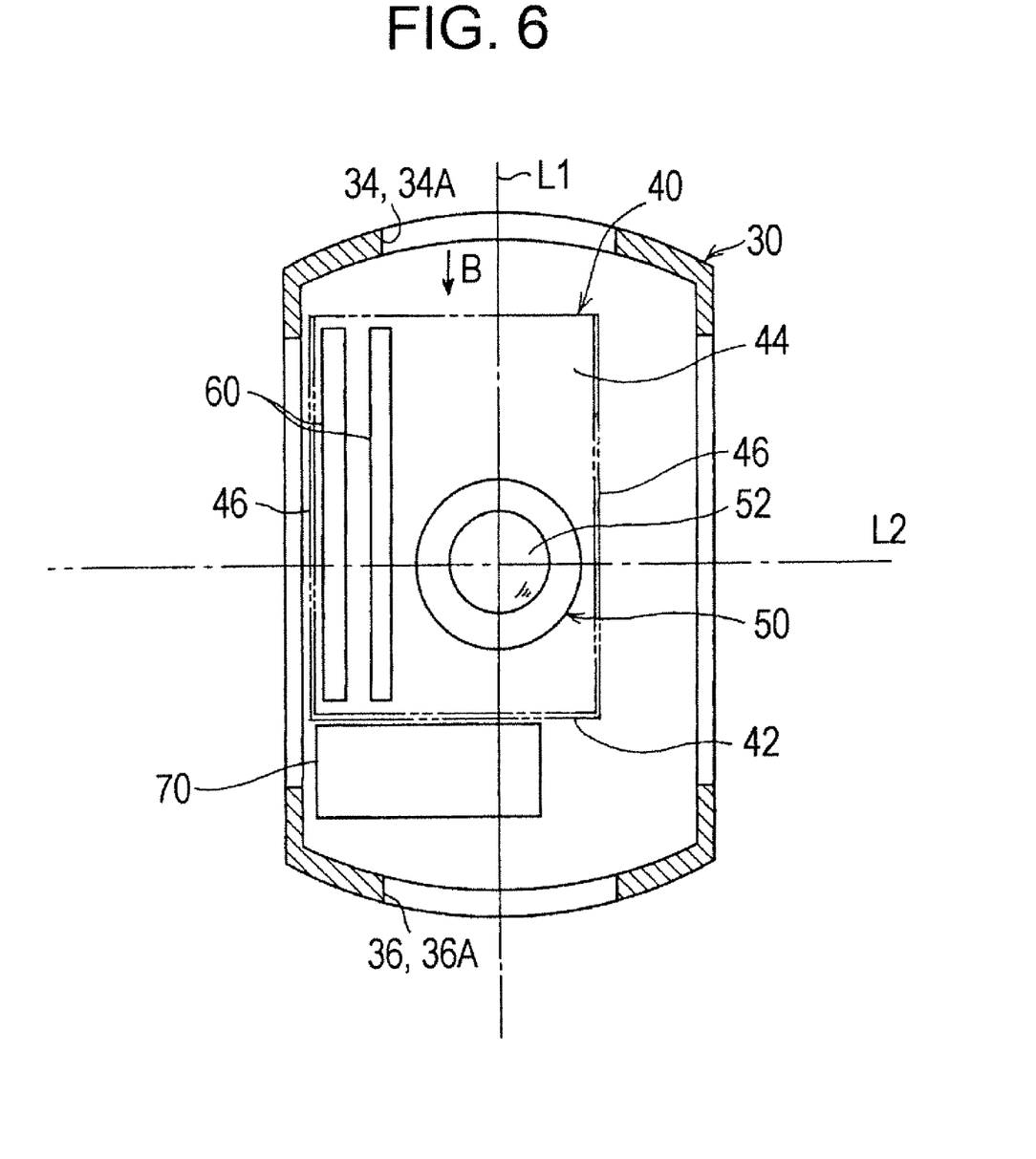
FIG. 6 is a cross section taken along line VI-VI of FIG. 5.
Figure 7:
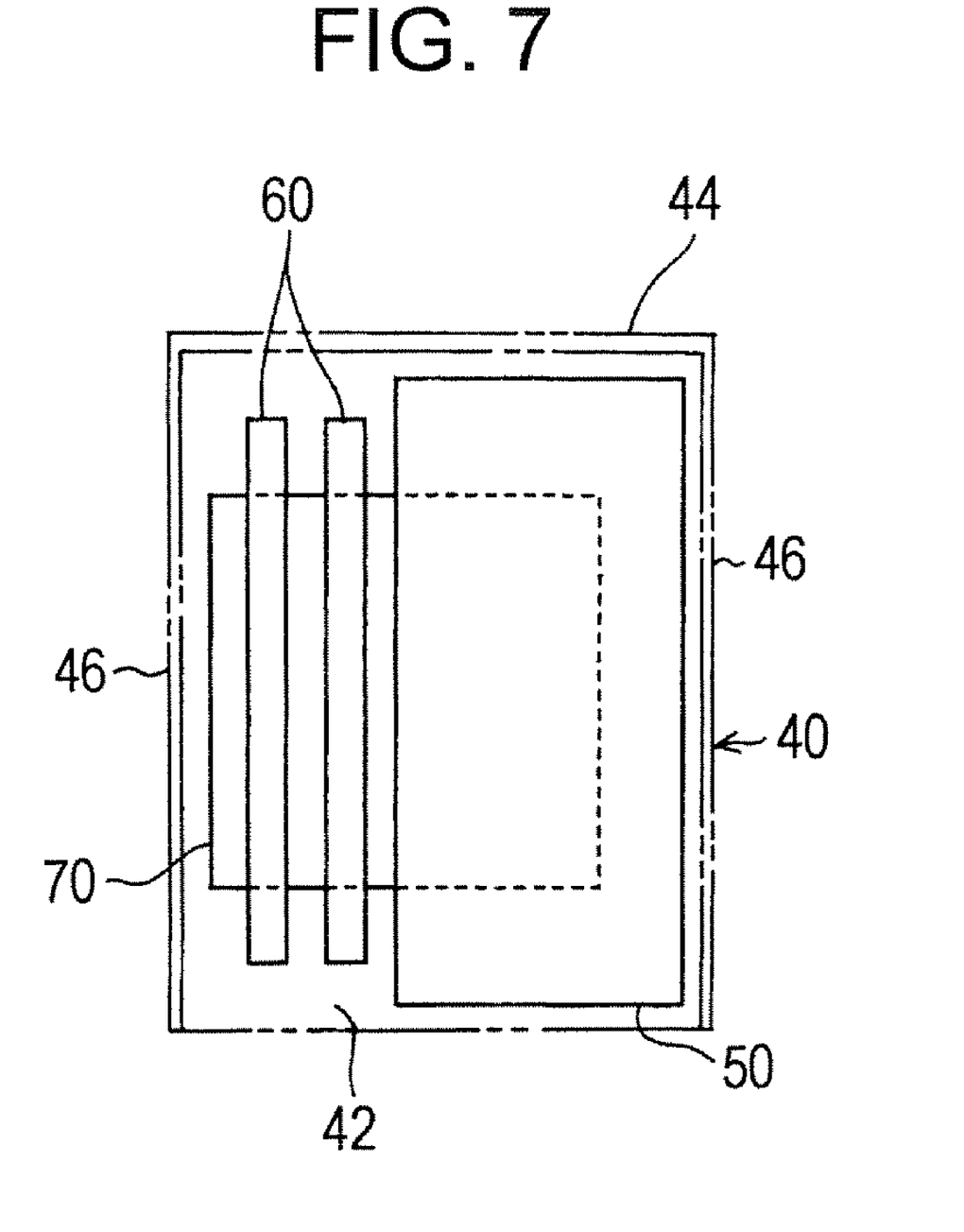
FIG. 7 is a view taken along the arrow B of FIG. 6.
Figure 8:
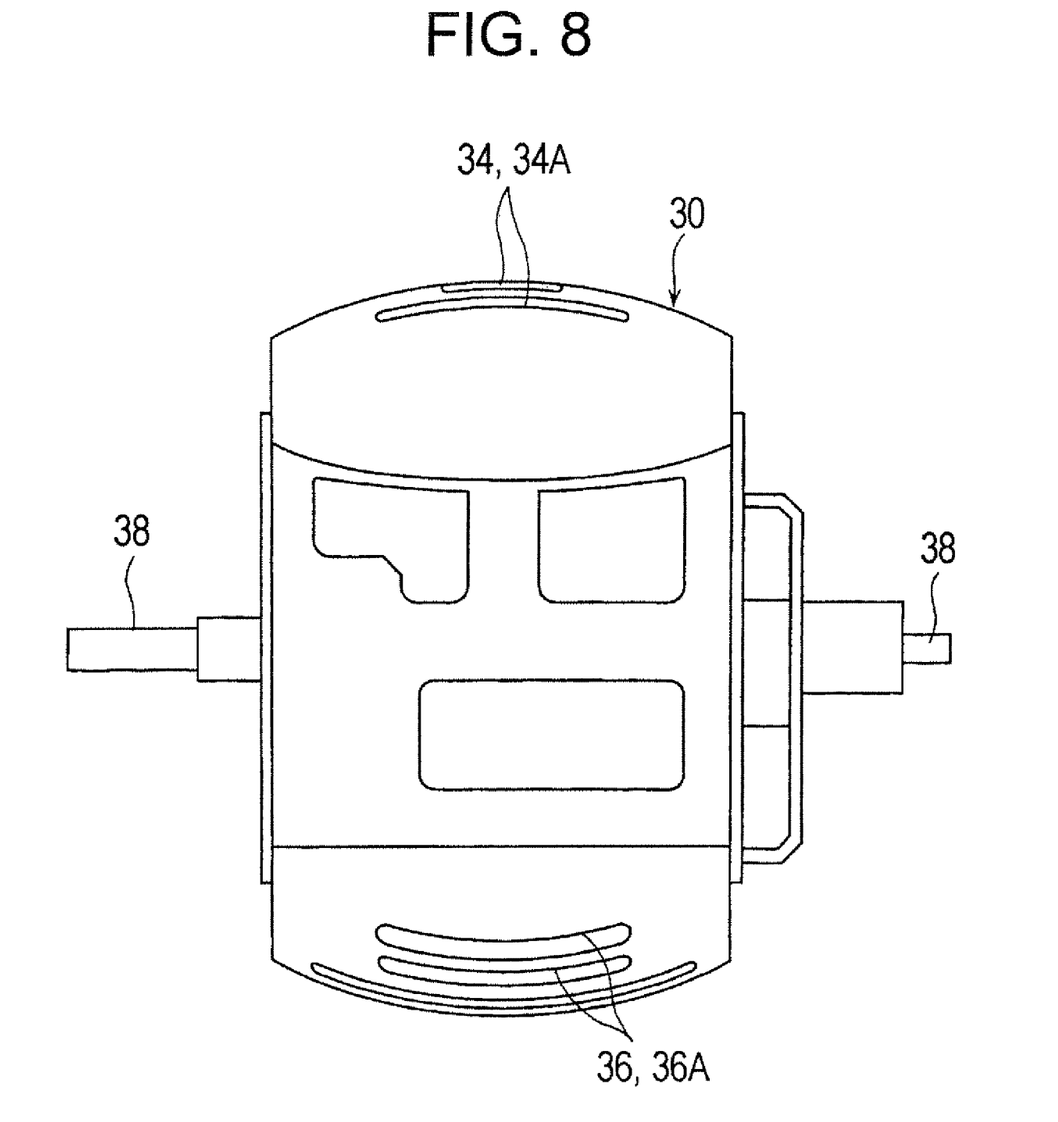
FIG. 8 is a rear view of an inner case 30.

FIG. 5 is a cross section showing the inner structure of the camera apparatus 100, FIG. 6 is a cross section taken along line VI-VI of FIG. 5, FIG. 7 is a view taken along the arrow B of FIG. 6, and FIG. 8 is a rear view of the inner case 30.

As shown in FIGS. 1 and 4, the inner case 30 is assembled in the outer case 20 so as to turn around a second imaginary axis L2 extending in a plane perpendicular to the first imaginary axis L1. In the present embodiment, the inner case 30 is turnable through 120 degrees around the second imaginary axis L2. In particular, in such a case where the base 10 is attached to a horizontal plane, the inner case 30 is turnable through 30 degrees in a direction toward the base 10 and 90 degrees in a direction away from the base 10 with respect to the reference position with the optical axis of the camera 50 set in a horizontal direction. The second imaginary axis L2 is a horizontal axis.

As shown in FIG. 1, the inner case 30 has a regular width smaller than that of the outer opening 22 to be assembled in the outer case 20 through the outer opening 22. As shown in FIG. 5, the inner case 30 has flat front and rear faces parallel to each other, and spherical upper and lower faces. As shown in FIG. 6, the left and right faces of the inner case 30 are circular with the center being open.

As shown in FIG. 5, a plurality of upper slits 34A and a plurality of lower slits 36A are respectively provided in the upper and lower faces of the inner case 30. The plurality of upper slits 34A define an air outlet 34, whereas the plurality of lower slits 36A define an air inlet 36.

As shown in FIGS. 1, 4 and 5, the gaps S1, S2, S3 and S4 are respectively secured between: the upper face of the inner case 30 and an upper rear part of an inner face of the outer case 20; the rear face of the inner case 30 and a rear part of the inner face of the outer case 20; the left and right faces of the inner case 30 and left and right parts of the inner face of the outer case 20; and the lower face of the inner case 30 and the disk 21.

The inner case 30 is disposed such that the front part thereof is exposed from the outer opening 22. An inner opening 32 is provided at the front part of the inner case 30.

As shown in FIG. 8, spindles 38 extend from the center of opposing parts in the width direction of the inner case 30 and project outward from the opposing parts. Bearings (not shown) are provided in the outer case 20 and the spindles 38 are supported by the bearings, so that the inner case 30 is assembled in the outer case 20 so as to be turnable around the second imaginary axis L2. When turning around the second imaginary axis L2, the front part of the inner case 30 moves within the outer opening 22, so that the inner opening 32 moves along the outer opening 22.

As shown in FIGS. 5 to 7, the supporting member 40 is attached to the inside of the inner case 30 with a screw.

The supporting member 40 is composed of synthetic resin and integrally molded with a die. The supporting member 40 is provided to extend forward and backward in the inner case 30.

The supporting member 40 includes a bottom plate 42, a standing plate 44 standing on the rear end of the bottom plate 42, lateral plates 46 standing on the left and right ends of the bottom plate 42, and the like.

Figure 9:
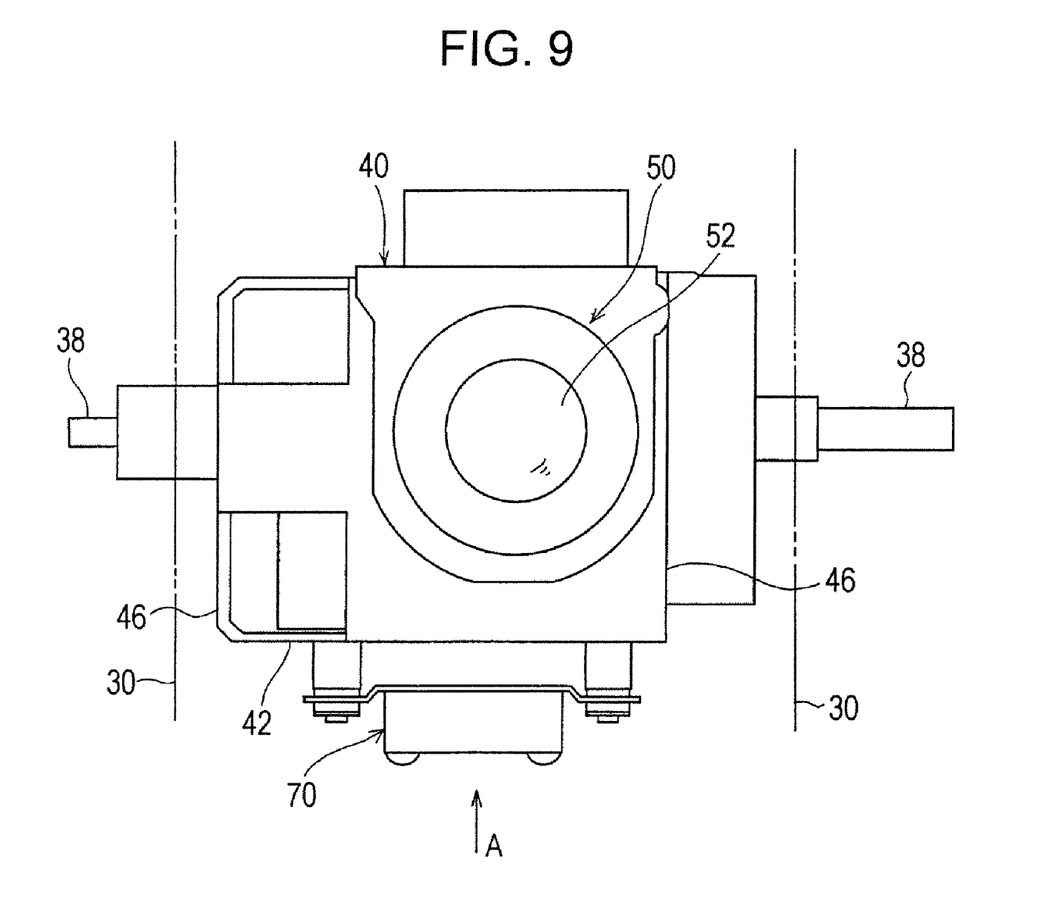
FIG. 9 is an explanatory view showing a state where a camera 50, a cooling fan 70 and the like are attached to a supporting member 40.
Figure 10:
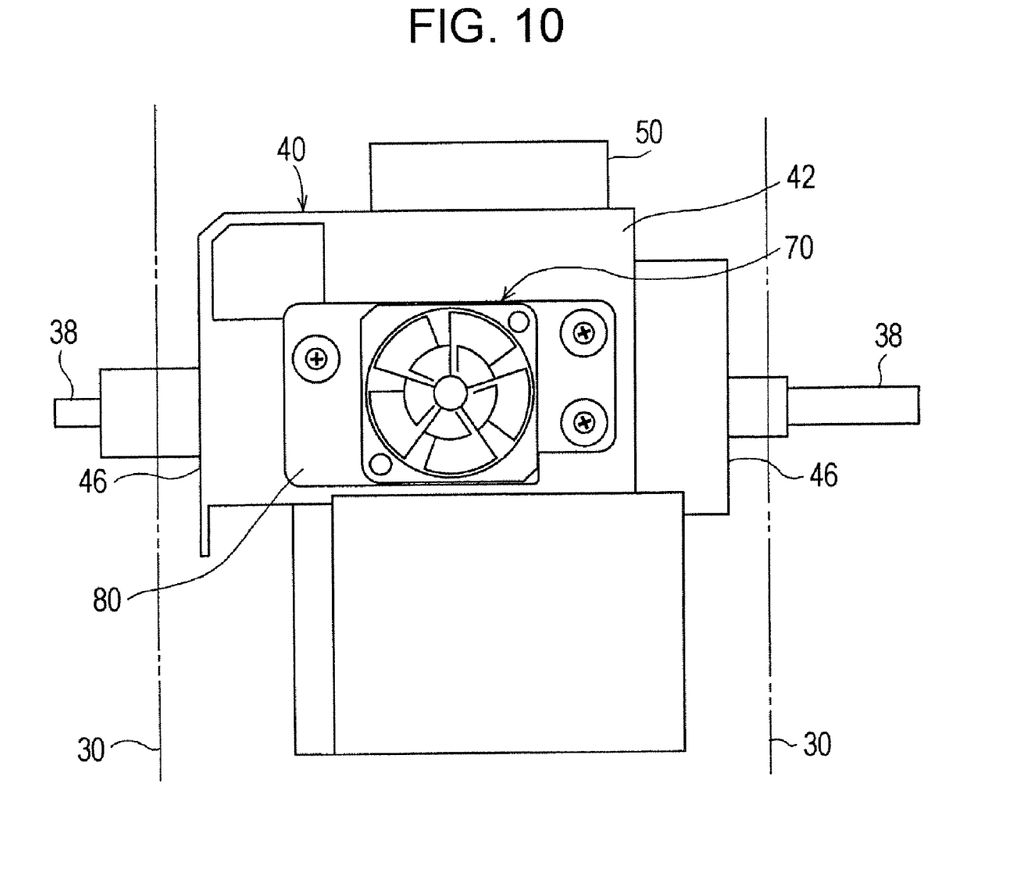
FIG. 10 is a view taken along the arrow A of FIG. 9.

As shown in FIGS. 9 and 10, the above-described spindles 38 are provided at the lateral plates 46.

As shown in FIGS. 5 to 7, the camera 50 is attached to the bottom plate 42 so as to be capable of imaging a subject through the outer opening 22 and the inner opening 32.

The camera 50 includes an imaging optical system for guiding a subject image, and an imaging element for imaging the subject image guided by the imaging optical system. The imaging optical system has a focusing mechanism and a zooming mechanism.

In the drawings, reference numeral 52 denotes an objective lens located in the uppermost part of the imaging optical system.

As shown in FIGS. 5 to 7, the two boards 60 are provided on the bottom plate 42 to be parallel to the lateral plates 46.

A circuit for controlling a focusing operation performed by the focusing mechanism and a zooming operation performed by the zooming mechanism, a circuit for processing an image signal output from the imaging element, and the like are mounted on the boards 60.

These circuits include electric components such as an integrated circuit element (IC: Integrated Circuit or LSI: Large-Scale Integrated circuit), a current control element (transistor) and the like. The electric components generate heat upon operation as current is supplied thereto.

FIG. 9 is an explanatory view showing a state where the camera 50, the cooling fan 70 and the like are attached to the supporting member 40, and FIG. 10 is a view taken along the arrow A of FIG. 9.

As shown in FIGS. 5 to 7, and FIGS. 9 and 10, the cooling fan 70 is provided in the inner case 30 to blow cooling air over the boards 60.

In the present embodiment, the cooling fan 70 is disposed on a lower face of the bottom plate 42 of the supporting member 40. Although not shown, an opening for attaching the cooling fan 70 is provided in the bottom plate 42.

Figure 11:
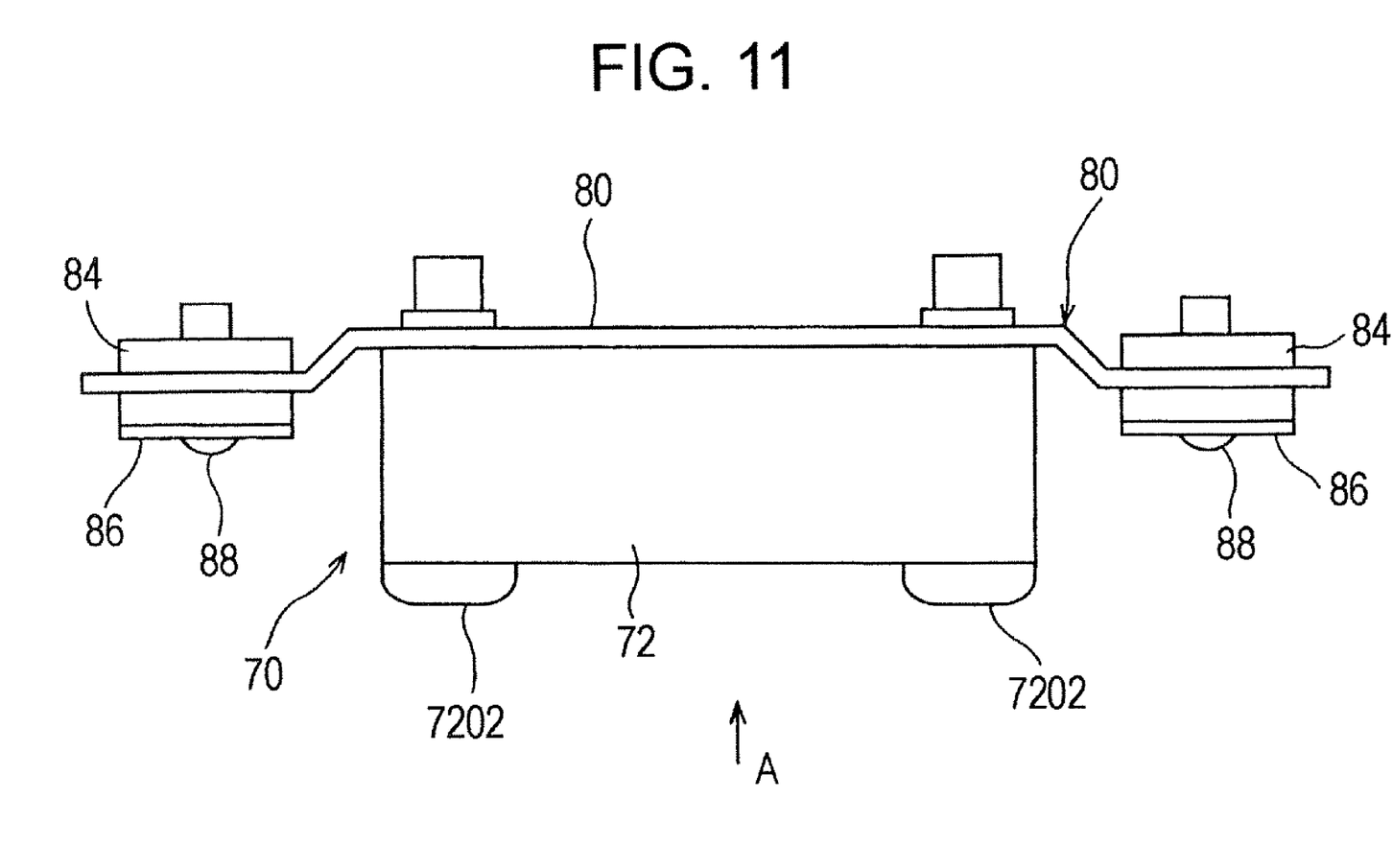
FIG. 11 is an explanatory view showing a state where the cooling fan 70 is attached to a mounting plate 80.
Figure 12:
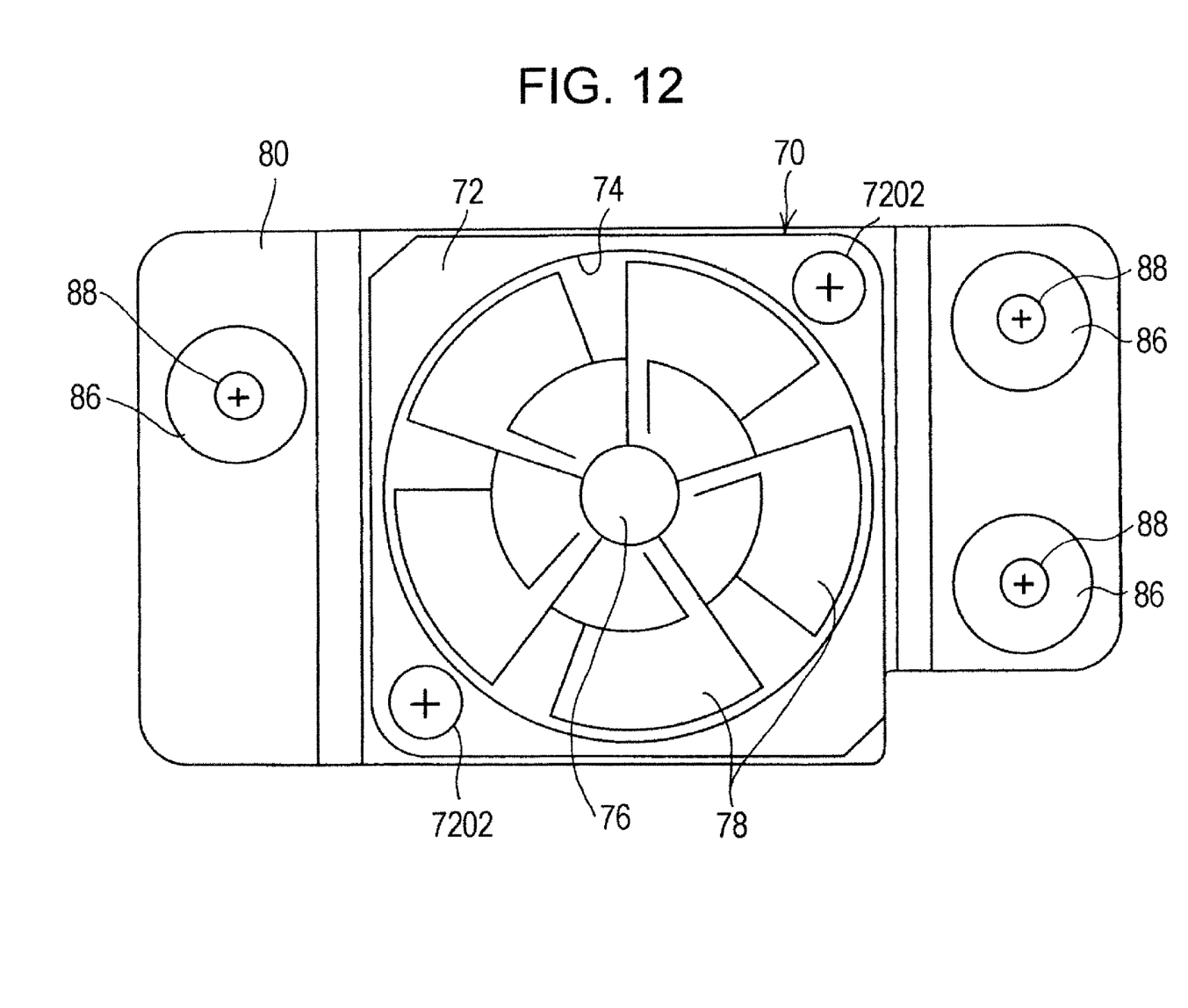
FIG. 12 is a view taken along the arrow A of FIG. 11.
Figure 13:
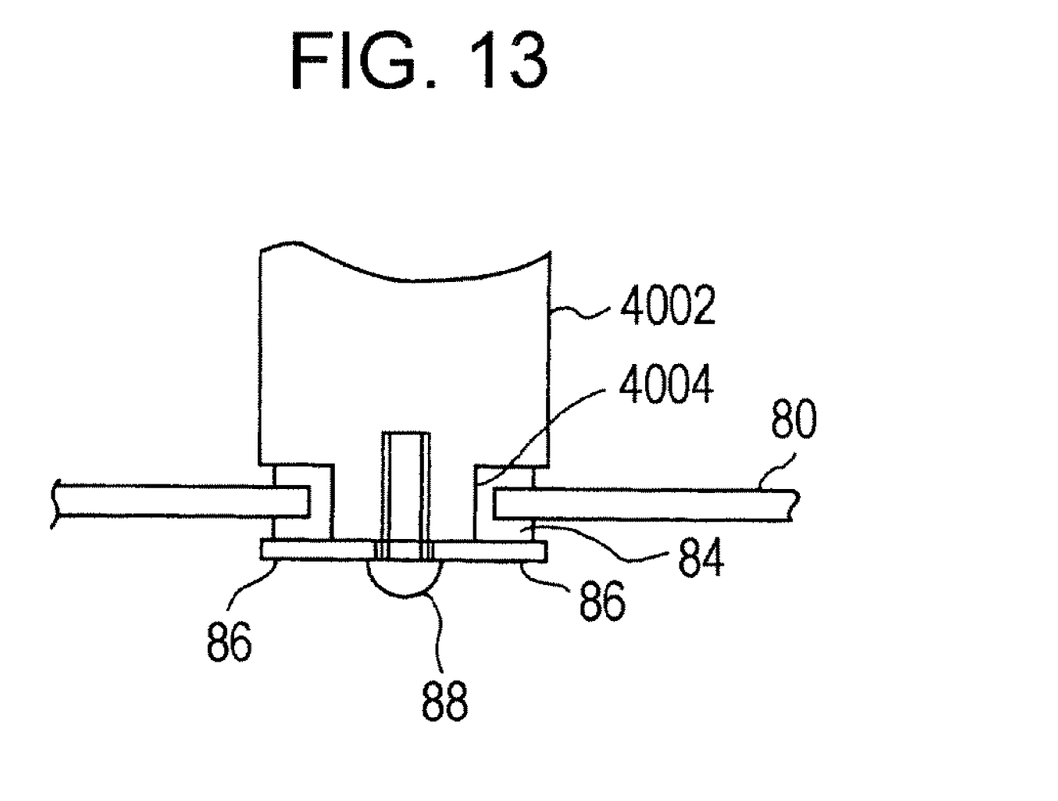
FIG. 13 is an explanatory view of a mounting part of the cooling fan 70 to the mounting plate 80.

FIG. 11 is an explanatory view showing a state where the cooling fan 70 is attached to a mounting plate 80, FIG. 12 is a view taken along the arrow A of FIG. 11, and FIG. 13 is an explanatory view of a mounting part of the cooling fan 70 connected to the mounting plate 80.

More specifically, as shown in FIGS. 11 and 12, the cooling fan 70 includes a fan case 72, a motor 76 disposed at an outer center opening 74 of the fan case 72, and vanes 78 attached to an output shaft of the motor.

As shown in FIGS. 11 to 13, the fan case 72 is attached to the mounting plate 80 with screws 7202. Vibration absorbing rubbers 84 are fitted to three mounting holes located on the outside of the mounting plate 80. Small diameter portions 4004 at tip ends of bosses 4002 which are integrally provided with and project from the supporting member 40 are inserted to center holes of the vibration absorbing rubbers 84. Washers 86 each having a size greater than an outer diameter of the vibration absorbing rubber 84 are arranged at tip ends of the small diameter portions 4004, and the washers 86 are attached to the small diameter portions 4004 with screws 88. Accordingly, the cooling fan 70 is disposed on the supporting member 40. That is, the cooling fan 70 is disposed with the vibration absorbing rubbers 84 interposed between the cooling fan 70 and the supporting member 40.

In addition, the air inlet 36 is located on an intake side of the cooling fan 70. As shown in FIGS. 5 and 6, the air outlet 34 is located at a position in an extension of a discharge side of the cooling fan 70 along the boards 60.

Next, a cooling operation by the cooling fan 70 will be described below.

Firstly, as shown in FIG. 5, while the inner case 30 is positioned at the reference position with the optical axis of the camera 50 set in the horizontal direction, the air inlet 36 of the inner case 30 is exposed to the disk 21 through the gap S4, and the air outlet 34 is exposed to an upper side of the outer case 20 through the outer opening 22.

In this state, when the cooling fan 70 is driven, ambient air is taken from the outer opening 22 to the air inlet 36 through the gap S4 as well as from the air circulation port 24 to the air inlet 36 through the gap S2, and blown over the boards 60 as the cooling air by the cooling fan 70. The cooling air blown over the boards 60 is discharged to the outside of the outer opening 22 from the air outlet 34.

Therefore, in such a case, the outer opening 22 serves as an air lead-in port for leading the cooling air to the air inlet 36 and an air lead-out port for leading the cooling air discharged from the air outlet 34 to the outside of the outer case 20. Besides, the air circulation port 24 serves as the air lead-in port for leading the cooling air to the air inlet 36.

Next, while the inner case 30 is positioned such that the optical axis of the camera 50 is set in a direction intermediate of the horizontal direction and an upward vertical direction (in a direction turned upward by 90 degrees relative to the horizontal direction), the air inlet 36 of the inner case 30 is exposed to the disk 21 through the gap S4, and the air outlet 34 is exposed to a rear upper part of the inner face of the outer case 20 through the gap S1.

In this state, when the cooling fan 70 is driven, the ambient air is taken from the outer opening 22 to the air inlet 36 through the gap S4 and blown over the boards 60 as the cooling air by the cooling fan 70. The cooling air blown over the boards 60 is discharged upward of the outer opening 22 from the air outlet 34 through the gap S1.

Therefore, in such a case, the outer opening 22 serves as the air lead-in port for leading the cooling air to the air inlet 36 and the air lead-out port for leading the cooling air discharged from the air outlet 34 to the outside of the outer case 20.

Next, while the inner case 30 is positioned such that the optical axis of the camera 50 is set in the upward vertical direction (in the direction turned upward by 90 degrees relative to the horizontal direction), the air inlet 36 of the inner case 30 is exposed to the front through the outer opening 22, and the air outlet 34 is exposed to the air circulation port 24 through the gap S2.

In this state, when the cooling fan 70 is driven, the ambient air is taken from the outer opening 22 to the air inlet 36 and blown over the boards 60 as the cooling air by the cooling fan 70. The cooling air blown over the boards 60 is discharged rearward through the gap S2 and the air circulation port 24 from the air outlet 34.

Therefore, in such a case, the outer opening 22 serves as the air lead-in port for leading the cooling air to the air inlet 36. Besides, the air circulation port 24 serves as the air lead-out port for leading the cooling air discharged from the air outlet 34 to the outside of the outer case 20.

Next, while the inner case 30 is positioned such that the optical axis of the camera 50 is turned downward by 30 degrees relative to the horizontal direction, the air inlet 36 of the inner case 30 is exposed to the air circulation port 24 through the gap S2, and the air outlet 34 is exposed to the outside through the outer opening 22.

In this state, when the cooling fan 70 is driven, the ambient air is taken from the air circulation port 24 to the air inlet 36 through the gap S2 and blown over the boards 60 as the cooling air by the cooling fan 70. The cooling air blown over the boards 60 is discharged obliquely upward of the outer opening 22 from the air outlet 34.

Therefore, in such a case, the air circulation port 24 serves as the air lead-in port for leading the cooling air to the air inlet 36. Besides, the outer opening 22 serves as the air lead-out port for leading the cooling air discharged from the air outlet 34 to the outside of the outer case 20.

As described above, according to the present embodiment, regardless of the position of the inner case 30 which turns around the second imaginary axis L2, the ambient air outside the outer case 20 is taken by the cooling fan 70 through the air lead-in port and the air inlet 36 and blown over the boards 60. The cooling air blown over the boards 60 is discharged out of the outer case 20 through the air outlet 34 and the air lead-out port.

Accordingly, the heat generated by the electric components of the boards 60 can be effectively cooled with the cooling air. The heat transmitted to the camera 50 can be reduced in the inner case 30. Accordingly, the lubricant such as the grease applied to the sliding parts of the camera 50 can be securely prevented from being deteriorated, thereby being significantly advantageous to improve the durability of the camera 50.

Therefore, the heat-related problems generated by the electric components due to the downsizing of the camera apparatus 100 can be addressed, which is advantageous to downsize the camera apparatus 100.

In addition, since the cooling fan 70 is provided with the vibration absorbing rubbers 84 interposed in the present embodiment, the influence on the camera 50 on account of the vibration of the cooling fan 70 can be immediately reduced, thereby being advantageous to obtain a sharp image by the Pan/Tilt/Zoom camera.

Incidentally, the above-described lubricant possibly evaporate due to the heat. If the evaporated lubricant is attached to the optical components such as a lens of the imaging optical system of the camera 50 and causes a haze, the image quality of an image provided by the imaging element is possibly affected by the haze.

However, according to the present embodiment, the heat generated by the electric components of the boards 60 can be effectively cooled with the cooling air, so that the lubricant is reliably prevented from evaporating, thereby being extremely advantageous to ensure the image quality of the image.

It should be understood by those skilled in the art that various modifications, combinations, sub-combinations and alterations may occur depending on design requirements and other factors insofar as they are within the scope of the appended claims or the equivalents thereof.

What is claimed is:

1. A camera apparatus, comprising:
   a base;
   an outer case that is assembled on the base and that is configured to rotate around a first axis which passes through the base, wherein the outer case includes an outer opening which extends from the base to a top of the outer case;
   an inner case that is assembled within the outer case and that is configured to rotate around a second axis which extends in a plane intersecting with the first axis, wherein the inner case includes:
   an inner opening configured to move along the outer opening when the inner case rotates around the second axis,
   a supporting member assembled within the inner case,
   a camera that is attached to the supporting member and that is configured to perform imaging of a subject through the outer opening and the inner opening, and that is configured to perform a focusing operation and a zooming operation,
   a board that is attached to the supporting member and that includes a first circuit configured to control the focusing operation and the zooming operation and a second circuit configured to process an image signal generated by imaging the subject, and
   a cooling fan configured to blow cooling air from an air inlet, over the board, and to an air outlet;
   wherein the outer case includes an air circulation port which alternatively provides air to the air inlet or exhausts air from the air outlet depending on a rotation of the inner case relative to the outer case.

2. The camera apparatus according to claim 1, wherein the second axis extends in a plane perpendicular to the first axis, the outer opening extends along a direction parallel to the first axis, and the outer opening is the air circulation port.

3. The camera apparatus according to claim 1, wherein the second axis extends in a plane perpendicular to the first axis, and the outer opening extends along a direction parallel to the first axis, and wherein the inner case is assembled such that a plurality of air gaps are formed between the inner case and the outer case and an air flow path includes the outer opening, the air circulation port the air gaps, the air inlet, and the air outlet.

4. The camera apparatus according to claim 1, wherein the base includes a mounting surface to which the outer case is attached, and the first axis is perpendicular to the mounting surface.

5. The camera apparatus according to claim 1, wherein the base includes a mounting surface to which the outer case is attached, the first axis is perpendicular to the mounting surface, and the outer case extends in a direction perpendicular to the mounting surface.

6. The camera apparatus according to claim 1, wherein the base includes a mounting surface to which the outer case is attached, the first axis is perpendicular to the mounting surface, the outer case is configured to extend in a direction perpendicular to the mounting surface, and the outer opening extends from a position where the outer case is exposed to the mounting surface to an end in the extending direction of the outer case.

7. The camera apparatus according to claim 1, wherein the base includes a mounting surface to which the outer case is attached, the first axis is perpendicular to the mounting surface, the outer case is configured to extend in a direction perpendicular to the mounting surface, the outer opening extends from a position where the outer case is exposed to the mounting surface to an end in the extending direction of the outer case, and the outer opening is the air circulation port.

8. The camera apparatus according to claim 1, wherein the base includes a mounting surface to which the outer case is attached, the first axis is perpendicular to the mounting surface, the outer case is configured to extend in a direction perpendicular to the mounting surface, the outer opening extends from a position where the outer case is exposed to the mounting surface to an end in the extending direction of the outer case, wherein an air flow path includes the outer opening, the air circulation port, the air inlet, and the air outlet.

9. The camera apparatus according to claim 1, wherein the cooling fan is attached to the supporting member with a vibration absorbing rubber interposed between the cooling fan and the supporting member.

* * * * *